(12) United States Patent
Vanderwende et al.

(10) Patent No.: US 8,209,617 B2
(45) Date of Patent: Jun. 26, 2012

(54) SUMMARIZATION OF ATTACHED, LINKED OR RELATED MATERIALS

(75) Inventors: Lucretia H. Vanderwende, Sammamish, WA (US); Michael Gamon, Seattle, WA (US); Rajatish Mukherjee, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 941 days.

(21) Appl. No.: 11/801,810

(22) Filed: May 11, 2007

(65) Prior Publication Data
US 2008/0282159 A1 Nov. 13, 2008

(51) Int. Cl.
G06F 3/00 (2006.01)
(52) U.S. Cl. ......................... 715/752; 715/254
(58) Field of Classification Search .......... 715/205–206, 715/760, 230, 232, 253–254, 273, 276–277, 715/714, 751–752, 866; 707/E17.121; 709/206–207
See application file for complete search history.

(56) References Cited

U.S. PATENT DOCUMENTS

| | | | |
|---|---|---|---|
| 5,077,668 A | 12/1991 | Doi | |
| 5,384,703 A | 1/1995 | Withgott et al. | |
| 5,867,164 A * | 2/1999 | Bornstein et al. | 715/236 |
| 5,978,820 A | 11/1999 | Mase et al. | |
| 6,172,675 B1 | 1/2001 | Ahmad et al. | 345/328 |
| 6,205,456 B1 * | 3/2001 | Nakao | 715/201 |
| 6,424,362 B1 | 7/2002 | Bornstein et al. | |
| 6,687,671 B2 | 2/2004 | Gudorf et al. | |
| 6,823,331 B1 | 11/2004 | Abu-Hakima | |
| 7,031,970 B2 | 4/2006 | Blitzer | |
| 7,051,024 B2 | 5/2006 | Fein et al. | |
| 7,117,437 B2 * | 10/2006 | Chen et al. | 715/254 |
| 7,120,865 B1 | 10/2006 | Horvitz et al. | 715/514 |
| 7,155,489 B1 | 12/2006 | Heilbron et al. | 709/217 |
| 7,162,413 B1 | 1/2007 | Johnson et al. | 704/9 |
| 7,181,683 B2 | 2/2007 | Chang | 715/513 |
| 7,392,280 B2 * | 6/2008 | Rohall et al. | 709/201 |
| 7,941,491 B2 * | 5/2011 | Sood | 709/206 |
| 2002/0073157 A1 | 6/2002 | Newman et al. | |
| 2002/0078091 A1* | 6/2002 | Vu et al. | 707/513 |
| 2002/0133339 A1 | 9/2002 | Gudorf et al. | |
| 2003/0028603 A1 | 2/2003 | Aktas et al. | |
| 2003/0079185 A1 | 4/2003 | Katariya et al. | |
| 2003/0158903 A1 | 8/2003 | Rohall et al. | 709/206 |

(Continued)

FOREIGN PATENT DOCUMENTS

WO WO 00/49536 8/2000

(Continued)

OTHER PUBLICATIONS

Potolook, http://www.potolook.com, Jan. 4, 2006, as evidenced by Internet Archive www.archive.org at http://web.archive.org/web/20060104074821/http://www.potolook.com/.*

(Continued)

Primary Examiner — William Bashore
Assistant Examiner — Andrew Tank
(74) Attorney, Agent, or Firm — Westman Champlin & Kelly, P.A.

(57) ABSTRACT

A summarization system and method. The summarization method includes utilizing a first body of information to obtain a second body of information, which is identified (by a hyperlink, an attachment identifier, a reference, etc.) in the first body of information. A summary of the obtained second body of information is then computed. The computed summary can be displayed to a user and/or stored for later use.

20 Claims, 5 Drawing Sheets

U.S. PATENT DOCUMENTS

| | | | |
|---|---|---|---|
| 2003/0212746 | A1 | 11/2003 | Fitzpatrick et al. |
| 2004/0034835 | A1 | 2/2004 | Kuruoglu et al. ............ 715/530 |
| 2004/0044735 | A1 | 3/2004 | Hoblit |
| 2004/0117340 | A1 | 6/2004 | Blitzer |
| 2004/0117448 | A1* | 6/2004 | Newman et al. ............ 709/206 |
| 2004/0117740 | A1 | 6/2004 | Chen et al. |
| 2004/0153309 | A1 | 8/2004 | Lin et al. ......................... 740/9 |
| 2005/0055359 | A1 | 3/2005 | Kawai et al. |
| 2005/0108338 | A1 | 5/2005 | Simske et al. |
| 2005/0203970 | A1 | 9/2005 | McKeown et al. |
| 2005/0262214 | A1* | 11/2005 | Bagga et al. ................. 709/207 |
| 2006/0259473 | A1 | 11/2006 | Li et al. |
| 2007/0143425 | A1* | 6/2007 | Kieselbach et al. .......... 709/206 |
| 2008/0098125 | A1* | 4/2008 | Wang Baldonado et al. . 709/231 |
| 2008/0109406 | A1 | 5/2008 | Krishnasamy et al. |
| 2008/0281927 | A1* | 11/2008 | Vanderwende et al. ...... 709/206 |
| 2008/0282159 | A1 | 11/2008 | Vanderwende et al. |
| 2009/0030940 | A1* | 1/2009 | Brezina et al. ............ 707/103 Y |

FOREIGN PATENT DOCUMENTS

WO  WO 2006/121338  11/2006

OTHER PUBLICATIONS

Delort et al., "Enhanced Wed Document Summarization Using Hyperlinks", Proceedings of the fourteenth ACM conference on Hypertext and hypermedia (HT'03), ACM 2003, pp. 208-215.*

Kuang-hua Chen et al., "An NTU-Approach to Automatic Sentence Extraction for Summary Generation,"http://acl.ldc.upenn.edu/X/X98/X98-1022.pdf, Annual Meeting of the ACL, Oct. 1998, pp. 163-170.

Lucy Vanderwende et al., "Microsoft Research at DUC2006: Task-Focused Summarization with Sentence Simplification and Lexical Expansion," http://duc.nist.gov/pubs/2006papers/duc2006_MSR_final.pdf, 2006, pp. 1-8.

Karen Jones, "Automatic Summarising the State of the Art," Information Processing and Management, special Issue on Automatic Summarising, 2007, pp. 1-52.

Unknown, "Extractor-Extractor is a Contextual Content Summerization Technology," http://www.extractor.com/, prior 2007, pp. 1-3.

International Search Report from counterpart foreign Application No. PCT/US2008/061804.

Office Action dated Jul. 22, 2009 for related U.S. Appl. No. 11/801,806, filed May 11, 2007; 23 pages.

Office Action dated Feb. 2, 2010 for related U.S. Appl. No. 11/801,806, filed May 11, 2007; 27 pages.

"Email Thread Reassembly Using Similarity Matching", Yeh et al.; CEAS 2006-Third Conference on Email and Anti-Spam, Jul. 27-28, 2006, Mountain View, CA; 8 pages.

"Exploiting E-mail Structure to Improve Summarization"; Lam et al.; ACM 2002, 8 pages.

"Generating Overview Summaries of Onging Email Thread Discussions", Wan et al.; http://acl.ldc.upenn.edu/coling2004/MAIN/pdf/79-215.pdf; prior to May 2007, 7 pages.

Potolook, http://www.potolook.com, Jan. 4, 2006, as evidenced by Internet Archive www.archive.org at http://web.archve.org/web/20060104074821/http://www.potolook.com/.

Delort et al.; "Enhanced Web Document Summarization Using Hyperlinks," Proceedings of the 14th ACM Conf. on Hypertext and Hypermedia (HT '03), ACM 2003, pp. 208-215.

Shen et al.; "Thread Detection in Dynamic Text Message Streams," SIGIR '06, Aug. 6-11, 2006, pp. 35-42.

Kim et al. "Topic Segmentation of Message Hierarchies for Indexing and Navigation Support," International World Wide Web Conf. Committee 2005, May 10-14, 2005, pp. 322-331.

Official Action dated Jul. 22, 2009, for Related U.S. Appl. No. 11/801,806, filed May 11, 2007. 23 pgs.

Official Action dated Dec. 6, 2010, for Related U.S. Appl. No. 11/801,806, filed May 11, 2007. 31 pgs.

Final Office Action dated Feb. 2, 2010, for Related U.S. Appl. No. 11/801,806, filed May 11, 2007. 27 pgs.

Non-Final Official Action dated Apr. 27, 2011 in related U.S. Appl. No. 11/801,806, filed May 11, 2007.

Cselle et al. ("BuzzTrack: Topic Detection and Tracking in Emal," IUI '07, Jan. 28-31, 2007, pp. 190-197).

* cited by examiner

SUMMARIZATION OF ATTACHED, LINKED OR RELATED MATERIALS

CROSS REFERENCE TO RELATED APPLICATION

Reference is made to co-pending and commonly assigned U.S. patent application Ser. No. 11/801,806, filed May 11, 2007, entitled "SUMMARIZATION TOOL AND METHOD FOR A DIALOGUE SEQUENCE," the content of which is hereby incorporated by reference in its entirety.

BACKGROUND

When a reader encounters a reference to another source, whether an attached document while reading electronic mail, an attached piece of voicemail, a hyperlink, or any other type of referenced material, the reader has a choice: either continue reading without examining the referenced material, or, follow the link to the referenced material and then go back to the referring, original, document. Opening and reading the referenced material can distract the reader away from the focus of the original document, in particular, when only a portion of the referenced material is relevant to the original document; opening and reading the referenced material can further be onerous in low-bandwidth situations.

The discussion above is merely provided for general background information and is not intended to be used as an aid in determining the scope of the claimed subject matter.

SUMMARY

A summarization system and method that addresses at least some of the above-noted problems is provided. The summarization method includes utilizing a first body of information to obtain a second body of information, which is identified (by a hyperlink, an attachment identifier, a reference, etc.) in the first body of information. A summary of the obtained second body of information is then computed. The computed summary can be displayed to a user and/or stored for later use.

In some embodiments, a focus of at least a portion of the first body of information is first computed. The computed focus is then utilized to help compute a focused summary of the second body of information.

A system that is capable of carrying out the above method embodiments is also provided.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present embodiments provide a summarization system and method that offers a user (electronic mail user, for example) a summarization of referenced materials (for example, a summarization of attachments to an electronic mail message), so that the user can obtain a summary of the referenced material without being distracted by the full extent of the referenced material and with fewer bandwidth requirements.

Figure 1:
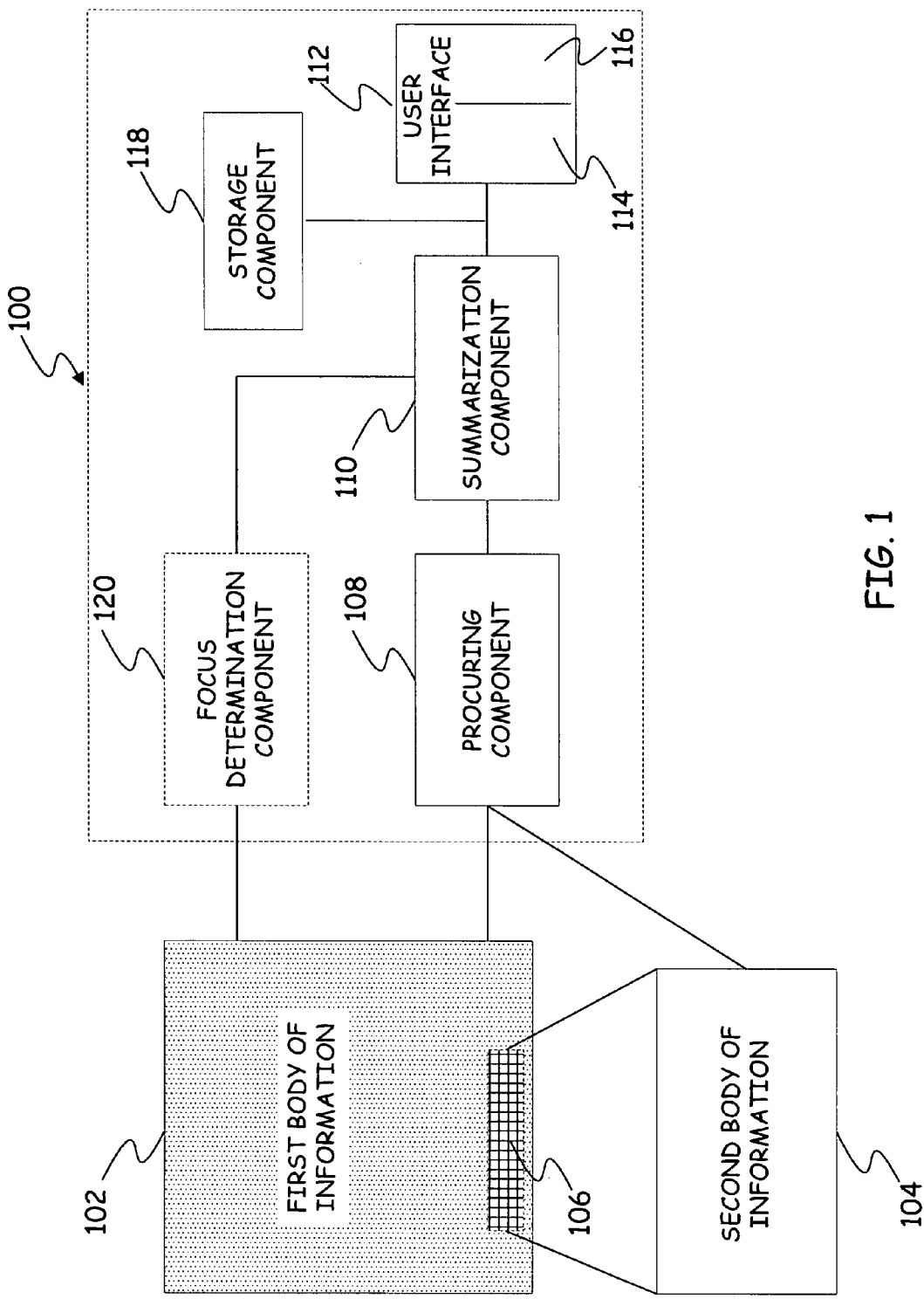
FIG. 1 is a simplified block diagram of an example summarization system in accordance with one of the present embodiments.

FIG. 1 is an example of a summarization system 100, in accordance with one of the present embodiments. Also shown in FIG. 1 is example information that system 100 is capable of summarizing. Specifically, FIG. 1 shows a first body of information 102 and a second body of information 104, which is identified (by an identifier 106, which can be a hyperlink, an attachment identifier, a reference, etc.) in the first body of information.

To perform its summarization operations, system 100 includes, as its primary components, a procuring component 108 and a summarization component 110. Procuring component 108 utilizes the first body of information 102 to obtain the second body of information 104 by, for example, first locating identifier 106 and then utilizing the located identifier to suitably obtain the second body of information 104. Procuring component 108 provides the obtained second body of information 104 to summarization component 110. Summarization component 110, upon receiving the second body of information 104 from procuring component 108, computes a summary of the second body of information 104 and outputs the computed summary. Summarization component 110 can utilize any suitable summarization technique that is currently known or will be developed in future. The computed summary can be displayed to a user via user interface 112 and/or stored in storage component 118 for later use. Component 118 can be any suitable memory (volatile, non-volatile, etc.) and component 112 can be any suitable type of user interface. Procuring component 108 and summarization component 110 can include suitable program code that is configured to carry out the procuring and summarization operations. In the present embodiments, the procuring and summarization operations are typically carried out substantially automatically, substantially in real-time and substantially without user intervention.

System 100 can also include a focus determination component 120 that is capable of computing a focus (scope and/or context, etc.) of at least a portion of the first body of information. The computed focus is provided to summarization component 110 which can utilize the focus to compute a focused summary of the second body of information 104. The focused summary can be stored in component 108 and/or provided to a user via user interface 112. Providing a focused summary allows the user to access information from the second body of information 104 that is most relevant to the current context of the first body of information 102. Examples in which a focused summary is particularly useful are provided further below.

As can be seen in FIG. 1, user interface 112 can include multiple sections such as first section 114 and second section 116. First section 114 can, for example, display identification information (such as a title, creation date, etc.) for the first body of information 102 and/or at least a portion of the first body of information 102. Second section 116 can display a summary (or focused summary) of the second body of information 104.

Figure 2A:
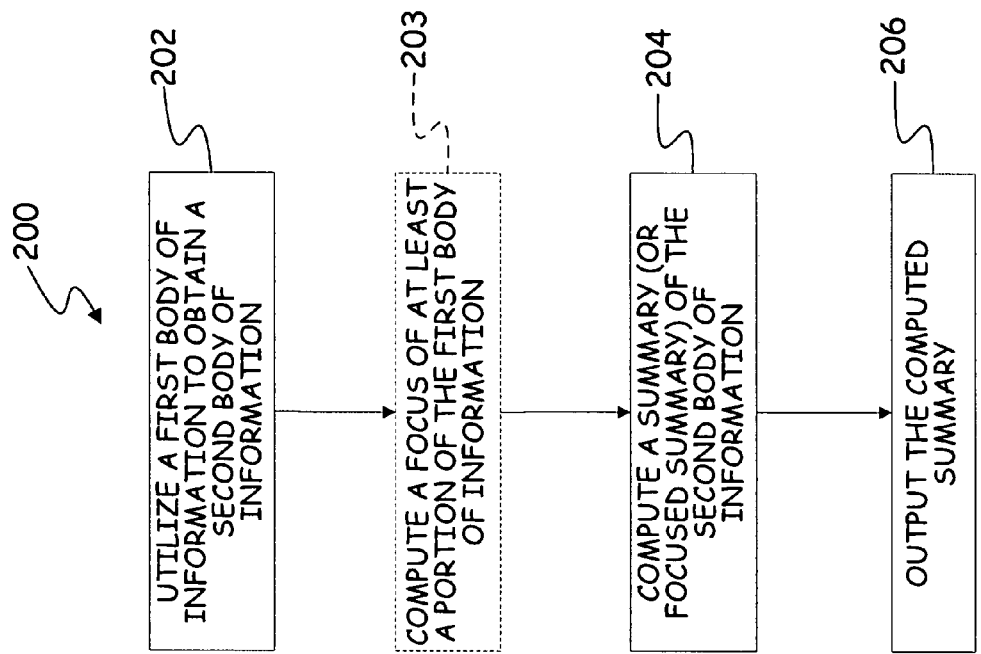
FIGS. 2A and 2B are simplified block diagrams showing general and specific summarization method embodiments.
Figure 2B:
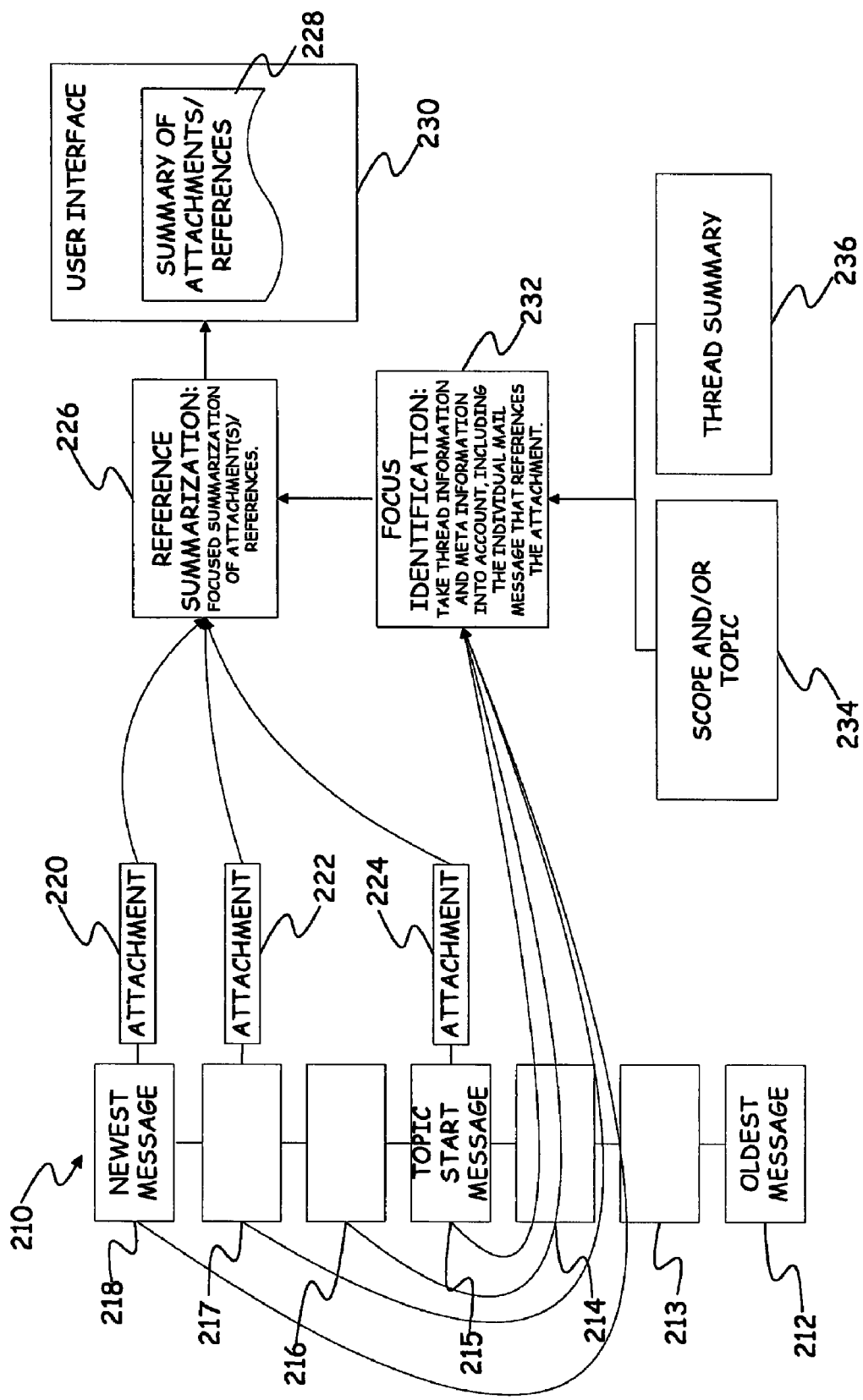

FIGS. 2A and 2B are simplified block diagrams showing general and specific method embodiments, respectively. In the general embodiment of FIG. 2A, at step 202, a first body of information is utilized to obtain a second body of information. The second body of information is identified (by a link, reference, an attachment identifier, etc.) in the first body of information and therefore step 202 can involve locating the respective link/reference/attachment identifier to obtain the second body of information. At step 204, a summary of the second body of information is computed. The computed summary is output at step 206.

In some embodiments, a focus of at least a portion of the first body of information is first computed (step 203). The computed focus is then utilized to help compute a focused summary of the second body of information.

In one embodiment, the first body of information is a message (for example, an electronic mail message) and the second body of information is an attachment to the message. FIG. 2B illustrates a specific method embodiment in which the first body of information is a message thread 210 (for example, an electronic mail thread) that includes a plurality of messages (212 through 218), and the second body of information is an attachment (attachment 220, for example) to one of the plurality of messages (newest message 218, for example) in the message thread. Of course, multiple attachments to single or multiple messages can also be included. In FIG. 2A, additional attachments are denoted by reference numerals 222 and 224. In some embodiments, summaries of attachments 220, 222 and 224 can be computed substantially independently of the plurality of messages (212 through 218) in the message thread. In other embodiments, a focus, based on at least some of the plurality of messages (212 through 218) is first computed. Computation of the focus (denoted by reference numeral 232) can be carried out by using a computed scope and/or topic 234 of at least some of the plurality of messages (212 through 218). A computed thread summary (summary of at least some of the messages in the message thread) 236 can also be used in addition to, or instead of, the computed scope and/or context 234, to compute the focus. A focused summary of the attachment(s) is then computed (denoted by reference numeral 226) as a function of the computed focus.

In some embodiments, computing a focus can involve determining, from the message thread 210, an oldest message that is related to the message to which the second body of information (attachment 220, for example) is attached. In FIG. 2B, the oldest related message can be message 215 (topic start message). Here, the oldest related message 215, the message to which the second body of information (attachment 220, for example) is attached (newest message 218) and all intervening messages (messages 216 and 217, for example) in the thread of messages can be used to compute the focus. In general, any suitable information can be used to compute the focus, which, as noted above, is used to determine a focused summary of the attachment(s). Computed summaries of attachments/references 228 can be output through user interface 230.

In some embodiments, the first body of information is a web page with an embedded hyperlink to the second body of information. Also, instead of being in a same form (for example, both the first body of information and the second body of information being text messages), each body of information can be in a different form. For example, the first body of information can be a text message and the second body of information can be a voice message.

Figure 3:
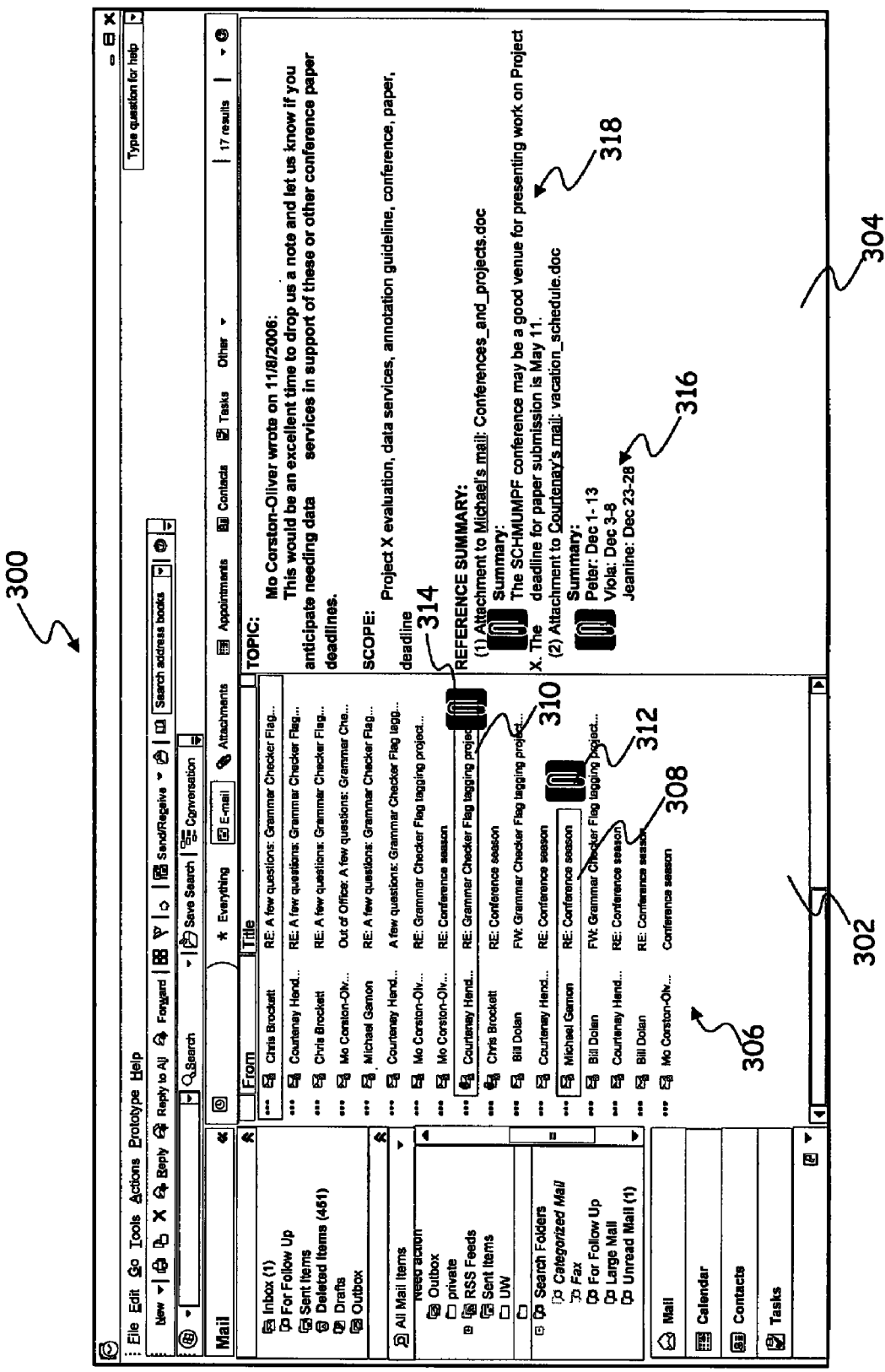
FIG. 3 is a user interface screen shot.

FIG. 3 is a simplified block diagram of a user interface screen shot 300 according to one embodiment. As can be seen in FIG. 3, a first section 302 of screen 300 includes a message thread 306 (with sender names and subjects of individual messages displayed). Messages 308 and 310 have attachments 312 and 314, respectively. Second section 304 of screen 300 shows attachment summaries 316 and 318 for attachments 312 and 314, respectively. In the example of FIG. 3, message 308 is a reply to a question regarding vacation policies, and its attachment 312 is a general vacation schedule. With the help of the present embodiments, a focused summary 316 that includes only relevant information from the general vacation schedule is provided. As noted above, in accordance with the present embodiments, summaries are substantially automatically computed, substantially in real-time and substantially without user intervention, thereby eliminating a need for the user to search through the attachment(s) for relevant information. In a specific embodiment, the summarization process can be carried out automatically as soon as the electronic mail thread is selected by the user, for example.

Figure 4:
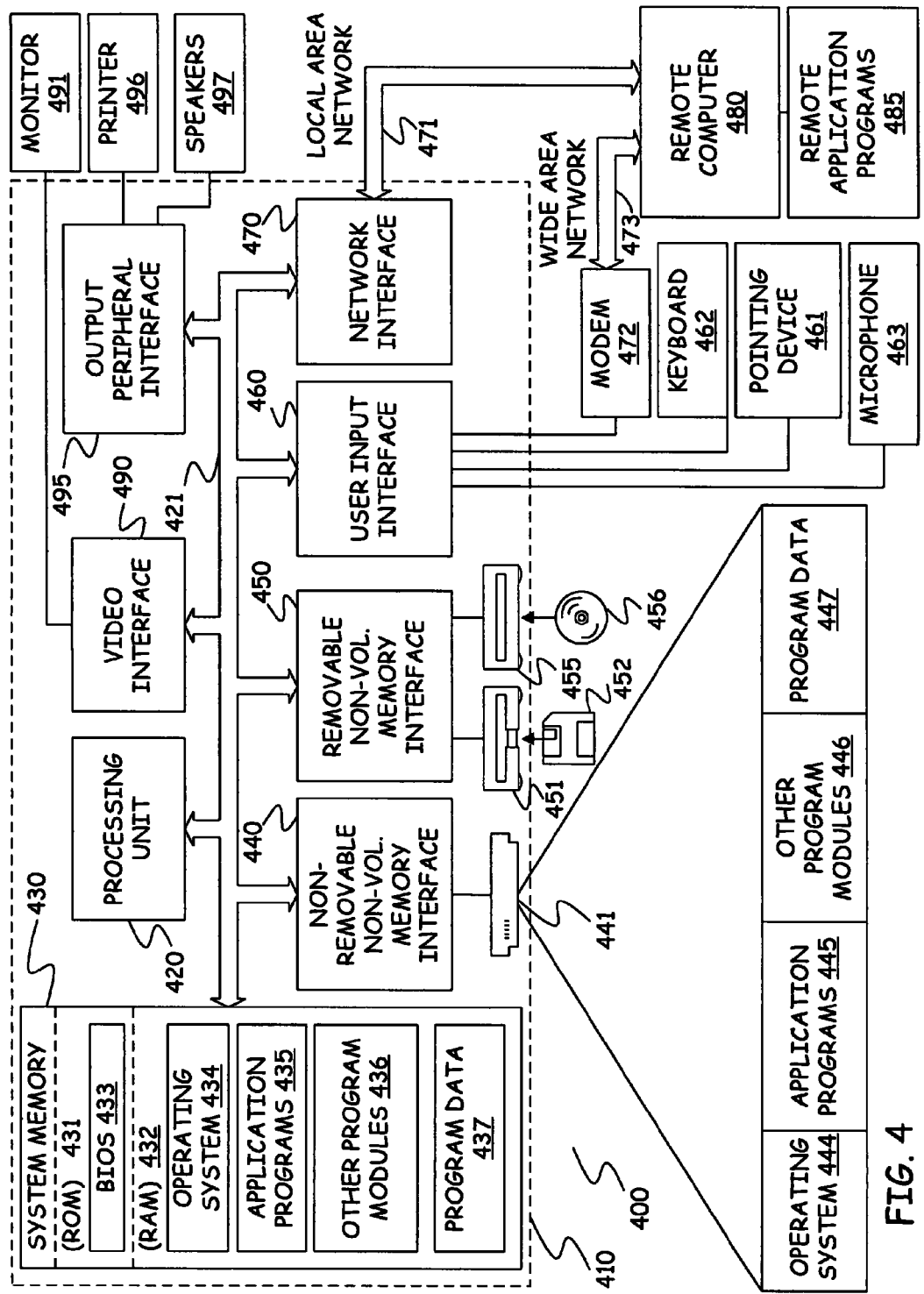
FIG. 4 is a block diagram of one illustrative operating environment in which summarization systems in accordance with the present embodiments can be implemented.

FIG. 4 illustrates an example of a suitable computing system environment 400 on which above-described summarization system embodiments may be implemented. The computing system environment 400 is only one example of a suitable computing environment and is not intended to suggest any limitation as to the scope of use or functionality of the claimed subject matter. Neither should the computing environment 400 be interpreted as having any dependency or requirement relating to any one or combination of components illustrated in the exemplary operating environment 400. Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, televisions, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 4, an exemplary system for implementing some embodiments includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. Still other input devices (not shown) can include non-human sensors for temperature, pressure, humidity, vibration, rotation, etc. These and other input devices are often connected to the processing unit 420 through a user input interface 460 that is coupled to the system bus, but may be connected by other interface and bus structures, such as a parallel port, game port or a USB. A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
utilizing a first body of information to obtain a second body of information and a third body of information, the first body of information including a message thread comprising a plurality of messages, the second body of information including a first attachment to one of the plurality of messages, the third body of information including a second attachment to another one of the plurality of messages, the second and the third bodies of information being identified in the first body of information;

computing a focus of at least a portion of the first body of information, the focus being based on a topic of the first body of information;

utilizing a processor that is a component of a computer to compute a focused summary of the second body of information and a focused summary of the third body of information, the first and the second focused summaries being based at least in part on the computed focus of the first body of information, the focused summaries including only information from the second and the third bodies of information that is relevant to the topic of the first body of information; and displaying a graphical user interface having a first portion and a second portion, the first portion including an indication of the message thread and indications of the first and the second attachments, the second portion including the computed focused summaries of the second and the third bodies of information.

2. The method of claim 1 wherein utilizing the first body of information to obtain the second body of information and the third body of information comprises finding identifiers to the second and the third bodies of information in the first body of information, and wherein the indication of the message thread includes a title and a creation date.

3. The method of claim 1 wherein the first body of information is a web page with an embedded hyperlink to the second body of information, and wherein the method further comprises storing the computed focused summaries to a storage component.

4. The method of claim 1 wherein the first body of information and the second body of information are both text messages.

5. The method of claim 1 where the first body of information is a text message and the second body of information is a voice message.

6. A computer-implemented method comprising:

utilizing a first body of information to obtain a second body and a third body of information, the first body of information being a message thread comprising a plurality of messages in the message thread, the second body of information being a first attachment to one of the plurality of messages in the message thread, the third body of information being a second attachment to another one of the plurality of messages in the message thread, the second and the third bodies of information being identified in the first body of information;

utilizing a computer processor that is a component of a computer to compute a focused summary of the second body of information and a focused summary of the third body of information, the first and the second focused summaries being determined by finding a focus of the message thread and computing the focused summaries as functions of the message thread focus; and displaying a graphical user interface having a first section and a second section, the first section including an indication of the message thread and indications of the first and the second attachments, the second section including the focused summaries for the second and the third bodies of information.

7. The method of claim 6 wherein the message thread is an electronic mail message thread and wherein the indications of the first and the second attachments in the first section of the graphical user interface comprise graphical representations.

8. The method of claim 7 wherein the focused summaries for the second and the third bodies of information displayed in the second section of the graphical user interface include graphical representations that correspond to the graphical representations in the first section of the graphical user interface.

9. The method of claim 8 wherein the graphical representations in the second section of the graphical user interface have corresponding textual summaries.

10. A computer-implemented system comprising:

a computer processor that is a component of a computer that utilizes a first body of information to obtain a second body and a third body of information, the first body of information including a message thread having a plurality of messages, the second body of information including a first attachment to one of the plurality of messages, the third body of information including a second attachment to another one of the plurality of messages, the second and the third bodies of information being identified in the first body of information, the computer processor computing a focused summary of the second body of information and a focused summary of the third body of information, the first and the second focused summaries being determined by finding a focus of the message thread and computing the focused summaries as functions of the message thread focus; and a user interface having a first section and a second section, the first section being configured to display an indication of the message thread and indications of the first and the second attachments, and the second section being configured to display the focused summaries of the second and the third bodies of information.

11. The system of claim 10 wherein the first body of information comprises an electronic mail message and the second body of information comprises a voice message.

12. The system of claim 10 wherein the first section of the user interface shows for each message in the plurality of messages a sender name and a subject.

13. The system of claim 10 wherein the computer processor finds identifiers to the second and the third bodies of information in the first body of information.

14. The system of claim 10 wherein the indication of the message thread includes a title and a creation date.

15. The system of claim 10 wherein the focused summaries of the second and the third bodies of information are stored to a storage component.

16. The system of claim 10 wherein the first, the second, and the third bodies of information comprise text messages.

17. The system of claim 10 wherein the indications of the first and the second attachments in the first section of the user interface comprise graphical representations.

18. The system of claim 17 wherein the focused summaries of the second and the third bodies of information displayed in the second section of the user interface include graphical representations that correspond to the graphical representations in the first section of the user interface.

19. The system of claim 18 wherein the graphical representations in the second section of the user interface have corresponding textual summaries.

20. The system of claim 10 wherein the focused summaries of the second and the third bodies of information include information that is relevant to a topic of the first body of information.

* * * * *